United States Patent
Zhao et al.

(10) Patent No.: US 11,930,211 B2
(45) Date of Patent: *Mar. 12, 2024

(54) METHOD AND SYSTEM FOR INTRA MODE CODING

(71) Applicant: Tencent America LLC, Palo Alto, CA (US)

(72) Inventors: Liang Zhao, Sunnyvale, CA (US); Xin Zhao, San Diego, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/825,770

(22) Filed: May 26, 2022

(65) Prior Publication Data

US 2022/0295096 A1    Sep. 15, 2022

Related U.S. Application Data

(63) Continuation of application No. 17/068,522, filed on Oct. 12, 2020, now Pat. No. 11,363,295.

(Continued)

(51) Int. Cl.
*H04N 19/593* (2014.01)
*H04N 9/11* (2006.01)
(Continued)

(52) U.S. Cl.
CPC ......... *H04N 19/593* (2014.11); *H04N 19/124* (2014.11); *H04N 19/13* (2014.11);
(Continued)

(58) Field of Classification Search
CPC .. H04N 19/593; H04N 19/172; H04N 19/157; H04N 19/124; H04N 19/176; H04N 19/184; H04N 19/13; H01N 9/11
See application file for complete search history.

(56) References Cited

U.S. PATENT DOCUMENTS 10,469,845 B1 * 11/2019 Zhao ................... H04N 19/105
2012/0230403 A1    9/2012 Liu et al.
(Continued)

OTHER PUBLICATIONS

The Japan Patent Office (JPO) Notification of Reasons for Refusal for Application No. 2021-559924 and Translation dated Nov. 14, 2022 7 Pages.
(Continued)

*Primary Examiner* — Joseph Suh
(74) *Attorney, Agent, or Firm* — ANOVA LAW GROUP PLLC

(57) ABSTRACT

A video decoding method includes obtaining a current frame of a video input; partitioning the current video frame into a plurality of coding blocks; predicting a symbol level for each coding block in intra prediction modes included in an allowed intra prediction mode (AIPM) set; transforming and quantizing a residual symbol level; entropy coding the transformed and quantized residual symbol level; and outputting a bitstream. The intra prediction modes included in the AIPM set are determined by determining whether a current video coding format for the current frame is of a video coding scheme based on VVC standard or a video coding scheme based on AV1 standard. The intra prediction modes include 6 most probable modes (MPM) and 32 remaining modes in the AIPM set for VVC standard, and directional modes of 8 nominal angles and non-directional or smooth modes in the AIPM set for AV1 standard.

20 Claims, 7 Drawing Sheets

Related U.S. Application Data

(60) Provisional application No. 62/941,350, filed on Nov. 27, 2019.

(51) Int. Cl.
  *H04N 19/124* (2014.01)
  *H04N 19/13* (2014.01)
  *H04N 19/157* (2014.01)
  *H04N 19/172* (2014.01)
  *H04N 19/176* (2014.01)
  *H04N 19/184* (2014.01)

(52) U.S. Cl.
  CPC ......... *H04N 19/157* (2014.11); *H04N 19/172* (2014.11); *H04N 19/176* (2014.11); *H04N 19/184* (2014.11); *H04N 9/11* (2013.01)

(56) References Cited

U.S. PATENT DOCUMENTS

| | | | |
|---|---|---|---|
| 2013/0136175 A1 | 5/2013 | Wang et al. | |
| 2017/0251213 A1 | 8/2017 | Ye et al. | |
| 2017/0339404 A1 | 11/2017 | Panusopone et al. | |
| 2017/0347094 A1* | 11/2017 | Su | H04N 19/44 |
| 2018/0176587 A1* | 6/2018 | Panusopone | H04N 19/63 |
| 2018/0332284 A1* | 11/2018 | Liu | H04N 19/139 |
| 2019/0045225 A1 | 2/2019 | Xu et al. | |
| 2019/0230352 A1* | 7/2019 | Heo | H04N 19/186 |
| 2019/0306499 A1 | 10/2019 | Zhang et al. | |
| 2020/0112728 A1* | 4/2020 | Ramasubramonian | H04N 19/176 |
| 2020/0162737 A1* | 5/2020 | Van der Auwera | H04N 19/126 |
| 2020/0169729 A1* | 5/2020 | Xu | H04N 19/521 |
| 2020/0336735 A1 | 10/2020 | Chang et al. | |
| 2021/0067786 A1* | 3/2021 | Ahn | H04N 19/119 |

OTHER PUBLICATIONS

Liang Zhao et al., "CE3-related: Intra mode coding," Joint Video Experts Team (JVET) of ITU-T SG 16 WP 3 and ISO/IEC JTC 1/SC 29/WG 11, Oct. 2018, JVET-L028-r1. 3 pages.

Yue Chen et al., "An Overview of Core Coding Tools in the AV1 Video Codec," 2018 Picture Coding Symposium (PCS), pp. 41-45, Jun. 2018. 5 pages.

Peter De Rivaz et al., "AV1 Bitstream & Decoding Process Specification," The Alliance for Open Media, 2018, [online] Available: https://aomediacodec.github.io/av1-spec/av1-spec.pdf 681 pages.

The World Intellectual Property Organization (WIPO) International Search Report for PCT/US20/62447 dated Feb. 23, 2021 2 Pages.

Afonso, "Intelligent Resampling Methods for Video Compression," in University of Bristol [online], published May 2019, [Retrieved on Jan. 29, 2021]. Retrieved from the Internet <URL: https://research-information.bris.ac.uk/ws/portalfiles/portal/201099956/MarianaAfonso_finalPhOthesis.pdf> entire document, especially pp. 18-19. 20 Pages.

European Patent Office European Search Report for Application No. 20893876.1 Dec. 15, 2022 12 pages.

Peter De Rivay et al:"AV1 Bitstream & Decoding Process Specification Codec Working Group Chair Adrian Grange, Google LLC Document Design", Jan. 8, 2019.

Seregin V et al:"Block shape dependent intra mode coding", 7. JVET Meeting; Jul. 13, 2017-Jul. 21, 2017; Torino; (The Joint Video Exploration Team of ISO/IEC JTC1/SC29/WG11 and ITU-T SG. 16 ), No. JVET-G015916 July 201.

\* cited by examiner

METHOD AND SYSTEM FOR INTRA MODE CODING

RELATED APPLICATIONS

This application is a continuation application of U.S. patent application Ser. No. 17/068,522, filed on Oct. 12, 2020, which claims priority to U.S. provisional patent application No. 62/941,350, filed on Nov. 27, 2019, the entire contents of both of which are incorporated by reference in its entirety.

FIELD OF THE TECHNOLOGY

This application relates to the field of video coding technologies and, specifically, to a method and system for intra mode coding.

BACKGROUND OF THE DISCLOSURE

AOMedia Video 1 (AV1) is an open video coding format designed for video transmissions over the Internet. It was developed as a successor to VP9 by the Alliance for Open Media (AOMedia), a consortium founded in 2015 that includes semiconductor firms, video on demand providers, video content producers, software development companies and web browser vendors. Many of the components of the AV1 project were sourced from previous research efforts by Alliance members. Individual contributors started experimental technology platforms years before: Xiph's/Mozilla's Daala already published code in 2010, Google's experimental VP9 evolution project VP10 was announced on 12 Sep. 2014, and Cisco's Thor was published on 11 Aug. 2015. Building on the codebase of VP9, AV1 incorporates additional techniques, several of which were developed in these experimental formats. The first version 0.1.0 of the AV1 reference codec was published on 7 Apr. 2016. The Alliance announced the release of the AV1 bitstream specification on 28 Mar. 2018, along with a reference, software-based encoder and decoder. On 25 Jun. 2018, a validated version 1.0.0 of the specification was released. On 8 Jan. 2019 a validated version 1.0.0 with Errata 1 of the specification was released. The AV1 bitstream specification includes a reference video codec.

ITU-T VCEG (Q6/16) and ISO/IEC MPEG (JTC 1/SC 29/WG 11) published the H.265/HEVC (High Efficiency Video Coding) standard in 2013 (version 1) 2014 (version 2) 2015 (version 3) and 2016 (version 4). In 2015, these two standard organizations jointly formed the JVET (Joint Video Exploration Team) to explore the potential of developing the next video coding standard beyond HEVC In October 2017, they issued the Joint Call for Proposals on Video Compression with Capability beyond HEVC (CfP). By Feb. 15, 2018, total 22 CfP responses on standard dynamic range (SDR), 12 CfP responses on high dynamic range (HDR), and 12 CfP responses on 360 video categories were submitted, respectively. In April 2018, all received CfP responses were evaluated in the 122 MPEG/10th JVET meeting. As a result of this meeting, JVET formally launched the standardization process of next-generation video coding beyond HEVC. The new standard was named Versatile Video Coding (VVC), and JVET was renamed as Joint Video Expert Team.

In the AV1, the number of available intra prediction modes is 62, which includes 56 angular intra prediction modes, 5 smooth modes, and 1 chroma-from-luma mode. The angular intra prediction modes are also called directional intra prediction modes. For 56 angular intra prediction modes, 8 of them are named as nominal angles, and each of the nominal angles has 7 delta angles (including the nominal angle itself which has 0 delta angle), which are different with the definition of the angles in the VVC. In addition, the number and definition of smooth modes of the video coding scheme based on the AV1 are also different with that of the video coding scheme based on the VVC. Therefore, the intra mode coding in JVET-L0280 (a VVC proposal) cannot be directly applied to the AV1 standard.

The disclosed methods and systems are directed to solve one or more problems set forth above and other problems.

SUMMARY

One aspect of the present disclosure includes a video decoding method. The method includes: obtaining a current frame of a video input; partitioning the current video frame into a plurality of coding blocks; predicting a symbol level for each coding block in intra prediction modes included in an allowed intra prediction mode (AIPM) set, where the AIPM set for luma components in each coding block is called AIPM_Luma, and the AIPM set for chroma components in each coding block is called AIPM_Chroma; transforming and quantizing a residual symbol level; entropy coding the transformed and quantized residual symbol level; and outputting a bitstream. The intra prediction modes included in the AIPM set are determined by: determining whether a current video coding format for the current frame is of a video coding scheme based on a Versatile Video Coding (VVC) standard or a video coding scheme based on an AOMedia Video 1 (AV1) standard; when the current video coding format is of the video coding scheme based on the VVC standard, including 6 most probable modes (MPM) and 32 remaining modes in the AIPM set; and when the current video coding format is of the video coding scheme based on the AV1 standard, including directional modes of 8 nominal angles and non-directional or smooth modes in the AIPM set, regardless of a size of the current coding block or the intra prediction modes of neighboring coding blocks.

Another aspect of the present disclosure includes a video decoding system. The system includes a memory storing computer program instructions; and a processor coupled to the memory and, when executing the computer program instructions, configured to perform: obtaining a current frame of a video input; partitioning the current video frame into a plurality of coding blocks; predicting a symbol level for each coding block in intra prediction modes included in an allowed intra prediction mode (AIPM) set, where the AIPM set for luma components in each coding block is called AIPM_Luma, and the AIPM set for chroma components in each coding block is called AIPM_Chroma; transforming and quantizing a residual symbol level; entropy coding the transformed and quantized residual symbol level; and outputting a bitstream. The intra prediction modes included in the AIPM set are determined by: determining whether a current video coding format for the current frame is of a video coding scheme based on a Versatile Video Coding (VVC) standard or a video coding scheme based on an AOMedia Video 1 (AV1) standard; when the current video coding format is of the video coding scheme based on the VVC standard, including 6 most probable modes (MPM) and 32 remaining modes in the AIPM set; and when the current video coding format is of the video coding scheme based on the AV1 standard, including directional modes of 8 nominal angles and non-directional or smooth modes in the AIPM set, regardless of a size of the current coding block or the intra prediction modes of neighboring coding blocks.

Other aspects of the present disclosure can be understood by those skilled in the art in light of the description, the claims, and the drawings of the present disclosure.

DESCRIPTION OF EMBODIMENTS

The following describes the technical solutions in the embodiments of the present invention with reference to the accompanying drawings. Wherever possible, the same reference numbers will be used throughout the drawings to refer to the same or like parts. Apparently, the described embodiments are merely some but not all the embodiments of the present invention. Other embodiments obtained by a person skilled in the art based on the embodiments of the present invention without creative efforts shall fall within the protection scope of the present disclosure. Certain terms used in this disclosure are first explained in the followings.

Versatile Video Coding (VVC): VVC is a video decoding standard developed by the Joint Video Exploration Team (JVET) to succeed the HEVC (also known as ITU-T H.265). VVC specifies a video coding technology with a compression capability that is substantially beyond that of the prior generations of such standards and is highly versatile for effective use in a broadened range of applications. VVC standard is incorporated herein by reference.

AOMedia Video 1 (AV1): AV1 is an open-source video coding standard developed by the Alliance for Open Media (AOMedia) for video transmissions over the Internet. AV1 standard is incorporated herein by reference.

Allowed intra prediction modes (AIPM): defined as one mode set with modes that can be used for intra prediction of current block derived according to the intra prediction modes of neighboring blocks.

Disallowed intra prediction modes (DIPM): defined as one mode set with modes that cannot be signaled or used for intra prediction of current block and derived according to the intra prediction modes of neighboring blocks.

Context-based Adaptive Binary Arithmetic Coding (CABAC): CABAC is a form of entropy coding used in various video coding standards.

Versatile video coding Test Model (VTM): VTM provides an encoder side description of VVC algorithm and the test procedures.

Bjontegaard delta rate (BDR or BD-rate): BDR is a method of evaluating coding efficiency by measuring bit-rate changes for a same peak signal-to-noise ratio (PSNR) of video signals.

Figure 1:
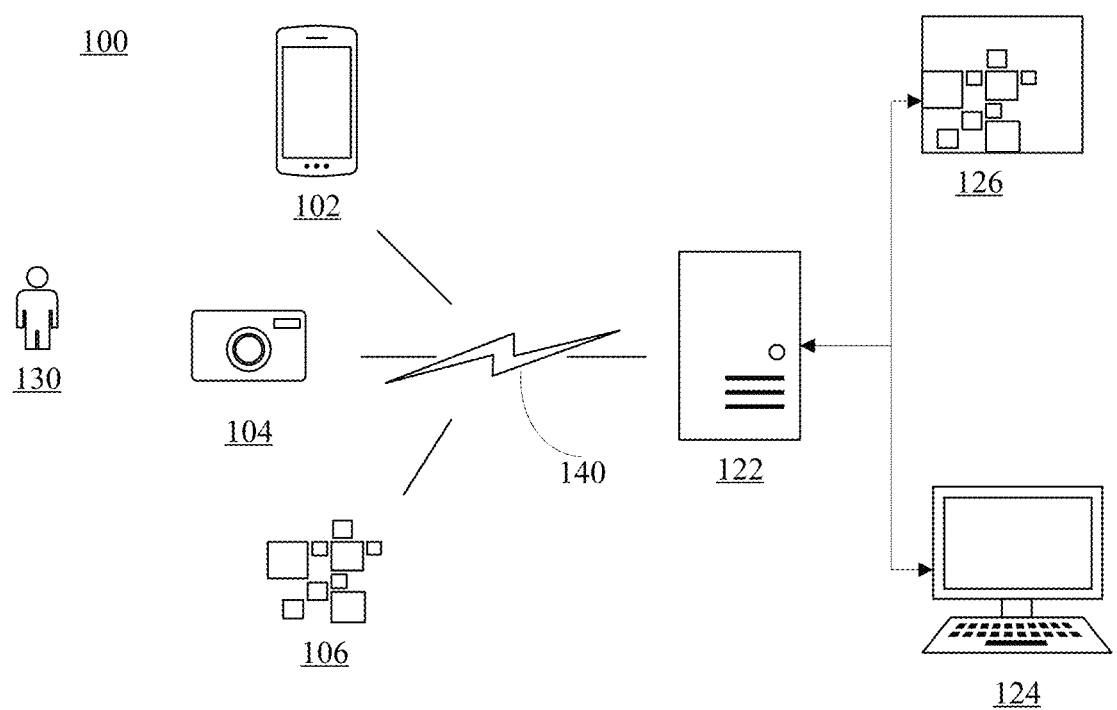
FIG. 1 illustrates an operating environment incorporating certain embodiments of the present disclosure.

FIG. 1 shows an operating environment 100 incorporating certain embodiments of the present disclosure. As shown in FIG. 1, the operating environment 100 may include a variety of devices with video functionalities. For example, the operating environment 100 may include a terminal device 102, a camera device 104, and an internet of things (IoT) device 106. Other types of devices may also be included.

The operating environment 100 may also include a server 122, a human vision application 124, a machine vision application 126, and a communication link 140 connecting the variety of devices to the server 122. A user 130 may use, access, or control one or more of the variety of devices.

The terminal device 102 may include any user terminal, such as a personal digital assistant (PDA), a mobile phone, a smart phone, an integrated messaging device (IMD), a tablet computer, a notebook computer, a desktop computer, and other computing devices. The camera device 104 may include any image or video capturing devices, such as a digital camera, a video camera, a security camera, a vehicle on-board camera, and a stereo camera, etc. The IoT device 106 may include any type of IoT device with a camera function, such as a digital doorbell, an autonomous driving sensor, a digital voice assistant, a smart speaker, a smart appliance, and any industrial or commercial IoT systems. Any of the variety of devices 102, 104, and 106 may be stationary or mobile when carried by an individual who is moving, and may also be located as a part or in a mode of transport including a car, a truck, a taxi, a bus, a train, a boat, an airplane, a bicycle, a motorcycle or any similar suitable mode of transport.

Figure 2:
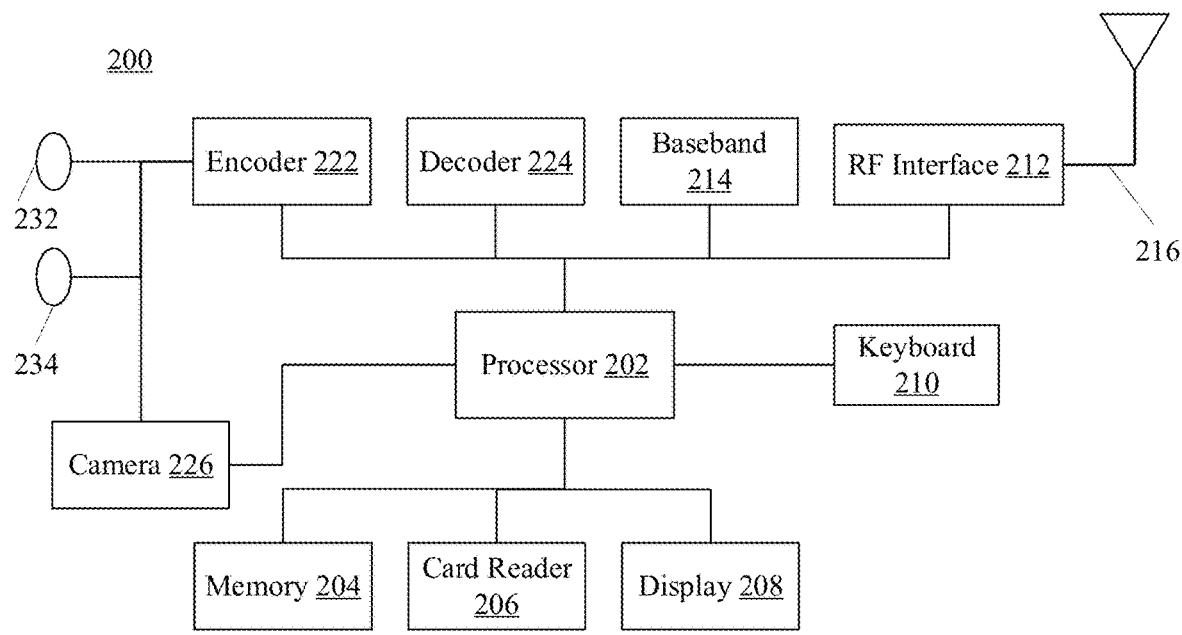
FIG. 2 illustrates an electronic device consistent with embodiments of the present disclosure.

FIG. 2 shows an electronic device for implementing any of the variety of devices 102, 104, and/or 106. As shown in FIG. 2, the electronic device 200 may include a hardware processor 202, a memory 204, a card reader 206, a display 208, a keyboard 210, a radio-frequency (RF) interface 212, a baseband 214, an antenna 216, an encoder 222, a decoder 224, a camera 226, a speaker 232, and a microphone 234, etc. The components shown in FIG. 2 are illustrative, certain components may be omitted, and other components may be added.

The processor 202 may be provided for controlling the electronic device 200. The processor 202 may be connected to other components through one or more bus or other electrical connections to send data to and receive data from the other components. The processor 202 may include one or more processing cores, for example, a 4-core processor or an 8-core processor. The processor 202 may be implemented by using at least one hardware form of digital signal processing (DSP), a field-programmable gate array (FPGA), an application specific integrated circuit (ASIC), and a programmable logic array (PLA). The processor 202 may also include a main processor and a coprocessor. The main processor may be a central processing unit (CPU), and the coprocessor may be a graphics processing unit (GPU) configured to be responsible for rendering and drawing content that a display screen needs to display. In some embodiments, the processor 202 may further include an artificial intelligence (AI) processor. The AI processor is configured to process a computing operation related to machine learning.

The memory 204 may include one or more computer-readable storage media, such as a high-speed random access memory and a nonvolatile memory, for example, one or more disk storage devices or flash storage devices. The memory 204 may store both data in the form of image and audio data and may also store instructions for the processor 202. The card reader 206 may include any type of portable card interface, such as a smart card interface, a communication card interface (e.g., near field communication (NFC) card), or a subscriber identifier module (SIM) card or other card interface for providing user information and being suitable for providing authentication information for authentication and authorization of the user 130.

Further, the display 208 may be any suitable display technology suitable to display an image or video. For example, the display 208 may include a liquid crystal display (LCD) screen, an organic light-emitting diode (OLED) screen, or the like, and may be a touch screen. The keyboard 210 may include a physical or virtual keyboard to input information by the user 130, and may also include other types of input/output devices. The speaker 232 and the microphone 234 may be used to input and output audio for the electronic device 200.

The RF interface 212 (together with the antenna 216) may include RF circuitry for receiving and transmit RF signals. The RF interface 212 may convert an electrical signal to an electromagnetic signal for transmission or convert a received electromagnetic signal into an electrical signal for receiving. The RF interface 212 may communicate with other electronic devices through at least one wireless communication protocol. The wireless communication protocol may include a metropolitan area network, mobile communications networks (2G, 3G, 4G, and 5G) of various generations, a wireless local area network (LAN), and/or a wireless fidelity (WiFi) network. In some embodiments, the RF interface 212 may also include a circuit related to near field communication (NFC). The baseband 214 may include circuitry for processing the signals to and from the RF interface 212.

Further, the camera 226 may include any type of imaging or video capturing device configured to collect an image or a video. When the electronic device 200 is a portable device carried by the user 130, the camera 226 may include a front-facing camera and a rear-facing camera. The front-facing camera may be disposed on the front panel of the electronic device, and the rear-facing camera is disposed on a rear surface of the electronic device. In some embodiments, there are at least two rear-facing cameras, each being any one of a main camera, a depth-of-field camera, a wide-angle camera, and a telephoto camera, so as to implement a background blurring function by fusing the main camera with the depth-of-field camera, and implement panoramic shooting and virtual reality (VR) shooting functions or other fusing shooting functions by fusing the main camera with the wide-angle camera. In some embodiments, the camera 226 may further include a flash.

The encoder 222 and the decoder 224 may be referred as the codec circuitry of the electronic device suitable for carrying out coding and decoding of audio and/or video data or assisting in coding and decoding carried out by the processor 202.

The electronic device 200 as shown in FIG. 2 may include structures similar to those of a mobile terminal or user equipment of a wireless communication system. However, any electronic device or apparatus which may require encoding and decoding, or encoding or decoding video or images may be included.

Returning to FIG. 1, the electronic device 200 (i.e., any one or more of the variety of devices 102, 104, and/or 106) may capture or collect various data (e.g., audio data, environment/operating data, image data, and/or video data) and send the data to the server 122 through the communication link 140. The electronic device 200 may process or pre-process the data before sending the data to the server 122, or may send the unprocessed data to the server 122.

The communication link 140 may include any appropriate type of communication network and may comprise any combination of wired or wireless networks including, but not limited to a wireless cellular telephone network, a wireless local area network (WLAN), a Bluetooth personal area network, an Ethernet local area network, a token ring local area network, a wide area network, and the Internet. The communication link 140 may also include private or public cloud computing platform for voice/data communication. When the Internet or other type of network is included, connectivity to the Internet may include long range wireless connections, short range wireless connections, and various wired connections including telephone lines, cable lines, power lines, and similar communication pathways.

Figure 3:
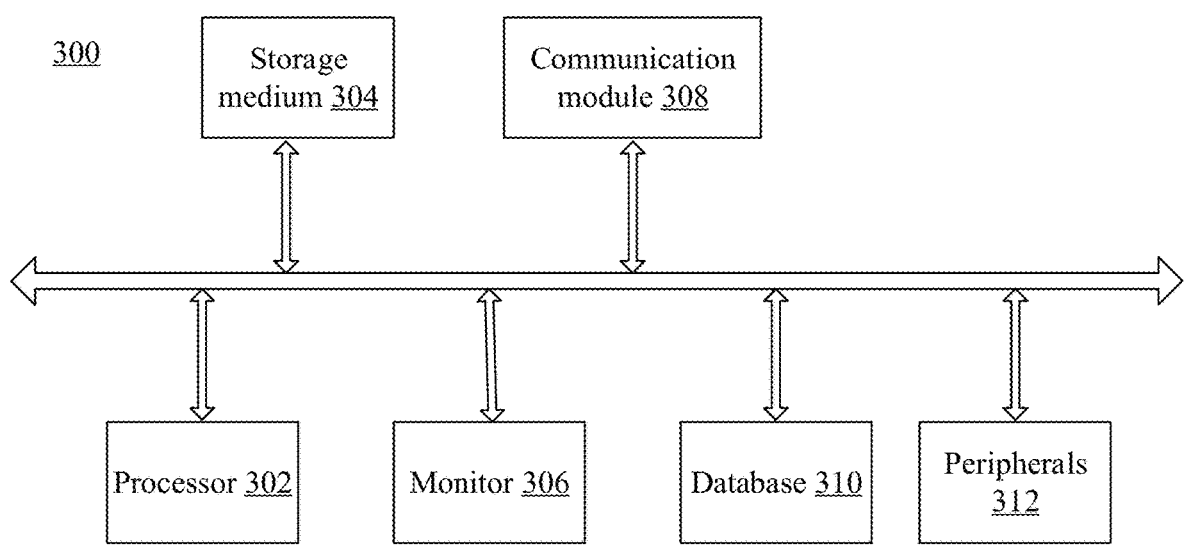
FIG. 3 illustrates a computer system consistent with embodiments of the present disclosure.

The server 122 may include any type of server computer system or multiple computer systems configured in a server cluster or distributed in different locations. The server 122 may also include a cloud server on a cloud computing platform. FIG. 3 illustrates an exemplary computer system implementing certain aspects of server 122.

As shown in FIG. 3, the computer system 300 may include a processor 302, storage medium 304, a monitor 306, a communication module 308, a database 310, and peripherals 312. Certain devices may be omitted and other devices may be included.

Processor 302 may include any appropriate processor or processors. Further, processor 302 can include multiple cores for multi-thread or parallel processing. Storage medium 304 may include memory modules, such as Read-only Memory (ROM), Random Access Memory (RAM), flash memory modules, erasable and rewritable memory, and mass storages, such as CD-ROM, U-disk, and hard disk, etc. Storage medium 304 may store computer programs for implementing various processes, when executed by processor 302.

Further, the peripherals 312 may include I/O devices such as a keyboard and a mouse. The communication module 308 may include network devices for establishing connections through the communication network. The database 310 may include one or more databases for storing certain data and for performing certain operations on the stored data, such as database searching.

Figure 4:
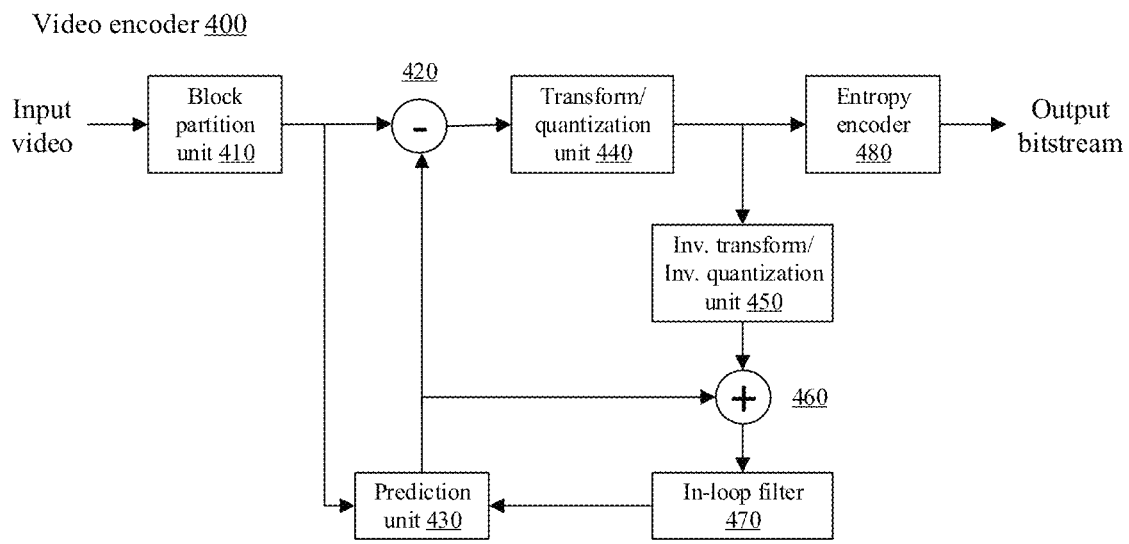
FIG. 4 illustrates a video encoder consistent with embodiments of the present disclosure.

Returning to FIG. 2, the encoder 222 may be an encoder implementing a method of intra mode coding. In this case, the electronic device 200 may also be considered to implement the method of intra mode coding. That is, the encoder 222 may be implemented as a hardware circuitry in the electronic device 200, or may be implemented as a software program by the electronic device 200, or a combination of the hardware circuitry and the software program. FIG. 4 illustrates an exemplary video encoder consistent with the disclosed embodiments of the present disclosure.

As shown in FIG. 4, the video encoder 400 includes a block partition unit 410, a subtraction unit 420, a prediction unit 430, a transform/quantization unit 440, an inverse quantization/inverse transform unit 450, an addition unit 460, an in-loop filter 470, and an entropy encoder 480. An input video is inputted into the encoder 400 and in response, the encoder 400 outputs a bitstream.

The input video includes a plurality of picture frames. Each picture frame is divided into a sequence of coding tree units (CTUs) by the block partition unit 410. For a picture frame that has three sample arrays, a CTU consists of an N×N block of luma samples together with two corresponding N×N blocks of chroma samples. The block partition unit 410 further splits the CTU into coding units (CUs) by using a quaternary-tree structure denoted as coding tree to adapt to various local characteristics. The decision whether to code a picture area using inter-picture (temporal) or intra-picture (spatial) prediction is made at a leaf CU level. Each leaf CU can further split into one, two, or four prediction units (PUs) according to a PU splitting type. Within one PU, the same prediction process is applied and the relevant information is transmitted to a video decoder on a PU basis. After obtaining a residual block by applying the prediction process based on the PU splitting type, a leaf CU can be partitioned into transform units (TUs) according to another quaternary-tree structure similar to the coding tree for the CU.

The prediction unit 430 supports intra prediction, inter prediction, and combined inter and intra prediction. The intra prediction is also called intra mode coding. To capture the arbitrary edge directions presented in a natural video, the prediction unit 430 supports 65 directional (or angular) intra-prediction modes in addition to planar (surface fitting) intra-prediction mode and DC (flat) intra-prediction mode. The prediction unit 430 further supports inter-predicted sample generation based on motion parameters including motion vectors, reference picture indices and reference picture list usage index, and additional information needed for video coding features. The prediction unit 430 also supports a transform skip mode where the CU coded in the transform skip mode or with transform skip is associated with one PU and has no significant residual coefficients, no coded motion vector delta or reference picture index. The prediction unit 430 also supports a merge mode where the motion parameters for the current CU are obtained from neighboring CUs, including spatial and temporal candidates, and additional schedules. The merge mode can be applied to any inter-predicted CU, not only for the transform skip mode. The prediction unit 430 also supports an alternative to the merge mode by explicitly transmitting motion parameters, where the motion vector, the corresponding reference picture index for each reference picture list and reference picture list usage flag, and other needed information are signaled explicitly per each CU.

The subtraction unit 420 outputs a difference (or a residual) between the CU and the PU to the transform/quantization unit 440.

The transform/quantization unit 440 supports large block-size transforms up to 64×64 in size. High frequency transform coefficients are zeroed out for the transform blocks with size equal to 64, so that only the lower-frequency coefficients are retained. When transforming a large block in the transform skip mode, the transform/quantization unit 440 uses the entire block without zeroing out any values. The transform/quantization unit 440 also supports multiple transform selection (MTS) for core transform. To control the MTS, the transform/quantization unit 440 uses separate enabling flags at a sequence parameter set (SPS) level for intra and inter prediction, respectively. When the MTS is enabled at the SPS level, a CU level flag is signaled to indicate whether the MTS is applied or not. The transform/quantization unit 440 also supports other transform features described in the VVC and AV1 draft standards, such as low-frequency non-separable transform (LFNST) and sub-block transform (SBT).

Further, the transform/quantization unit 440 supports a maximum of 63 quantization parameters (QPs). The transform/quantization unit 440 also supports a flexible luma-to-chroma QP mapping by signaling the luma-to-chroma mapping relationship in the SPS. The transform/quantization unit 440 also supports CU-level QP adaption where delta QP values for luma and chroma components can be signaled separately. The transform/quantization unit 440 also supports other quantization features described in the VVC and AV1 standards, such as dependent quantization.

The transform/quantization unit 440 also supports joint coding of chroma residuals, which is indicated by a TU-level flag.

Context-based Adaptive Binary Arithmetic Coding (CABAC) may be described as the entropy coding algorithm. The entropy encoder 480 includes a CABAC coding engine to encode syntax elements outputted by the transform/quantization unit 440. The CABAC coding engine supports arithmetic coding algorithms such as Golomb-Rice coding algorithm. The entropy encoder 480 supports separate residual coding structures for a transform block and a transform skip block. The entropy encoder 480 codes the transform coefficients of a coding block by using non-overlapped coefficient groups (CGs or sub-blocks) and each CG contains the transform coefficients of a coding block of a variable size. The size of the coefficient group is selected based on a transform block size only, which is independent of channel type. The size of the CGs may include 1×16, 2×8, 8×2, 2×4, 4×2, and 16×1. The CGs inside each coding block and the transform coefficients within each CG are coded according to pre-defined scanning orders.

Each coding block in a transform unit is split into a plurality of sub-blocks and each sub-block is split into a plurality of pixels. The plurality of sub-blocks include 4×4 or 2×2 sub-blocks.

In the arithmetic coding algorithm, a probability model is dynamically selected for each syntax element depending on an absolute level of the syntax element or a partially reconstructed absolute level of the syntax element in a local neighborhood.

The inverse quantization/inverse transform unit 450 reverses the quantization process and the transform process performed by the transform/quantization unit 440 and feeds an output to the addition unit 460 to reconstruct the picture frame. The addition unit 460 also takes the output of the prediction unit 430 as another input. The reconstructed picture will be filtered by the in-loop filter 470. The in-loop filter 470 includes a deblocking filter, a sample adaptive offset (SAO) filter, and an adaptive loop filter (ALF), which are cascaded in this order. The output of the in-loop filter 470 is inputted into the prediction unit 430.

Figure 5:
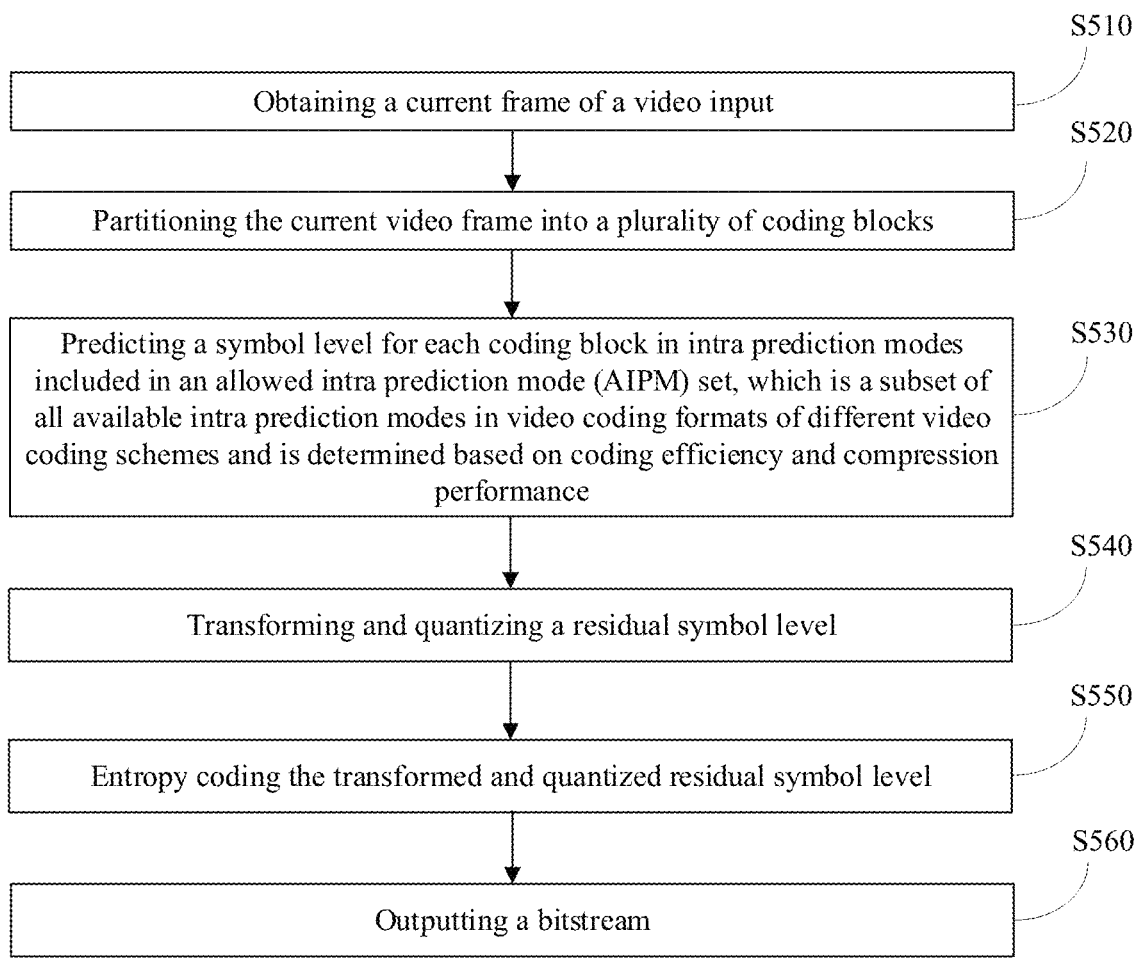
FIG. 5 illustrates an exemplary video coding method consistent with embodiments of the present disclosure.

The present disclosure provides a video encoding and/or decoding method. FIG. 5 illustrates a flowchart of an exemplary video encoding and/or decoding method consistent with embodiments of the present disclosure. As shown in FIG. 5, the video encoding and/or decoding method includes obtaining a current frame of a video input (at S510). After the current frame is obtained, the current frame may be divided into a plurality of coding blocks according to a partition tree structure.

At S520, the current frame is partitioned into a plurality of coding blocks. The current frame may be divided into various square and rectangular partitions. The square partitions may be further divided into smaller partitions. But the rectangular partitions cannot be further divided.

After the current frame is partitioned to the plurality of coding blocks, a symbol level is predicted for each coding block in intra prediction modes (at S530). Because the intra prediction modes are defined differently in different video coding formats of different video coding schemes based on different video coding standards, the intra prediction modes are determined to accommodate various video coding formats of different video coding schemes based on video coding standards, such as the AV1 standard and the VVC standard, to improve coding efficiency and compression performance. The corresponding intra prediction modes determined based on the coding efficiency and compression performance are a subset of all the available intra prediction modes defined in the corresponding video coding scheme. The subset is called available intra prediction mode (AIPM) set. The intra prediction modes included in the AIPM set are signaled by the video coding device, such as the video encoder 400 shown in FIG. 4. Because the number of the intra prediction modes included in the AIPM set is less than the number of all the available intra prediction modes defined in the corresponding video coding scheme, fewer bits are needed to signal the intra prediction modes included in the AIPM set. Further, the symbol level may be predicted for each coding block in inter prediction modes in addition to the intra prediction modes.

After the symbol level is predicted, a residual symbol level is transformed and quantized. The residual symbol level is a difference between the current symbol level and the predicted symbol level.

Figure 6:
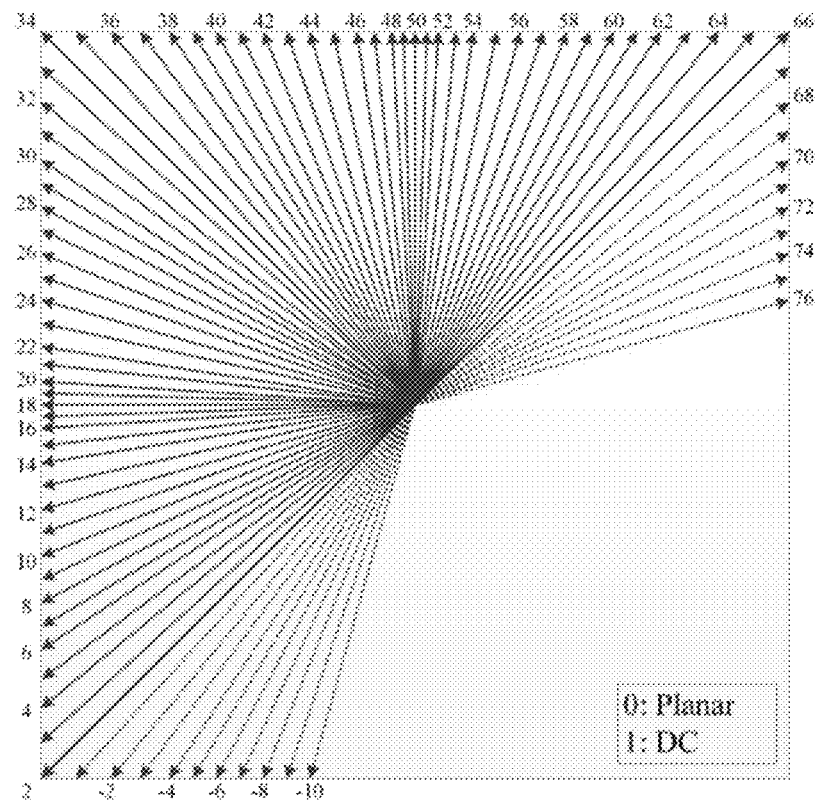
FIG. 6 illustrates the available intra prediction modes in the VVC standard.

One planar intra prediction mode, one DC intra prediction mode, and 85 angular intra prediction modes are defined by the VVC standard as shown in FIG. 6. However, the number of available intra prediction modes is always 67 for each coding block. To code an intra prediction mode, a most probable mode (MPM) list of size 3 is constructed using the intra prediction modes of two neighboring coding blocks. Firstly, one MPM flag is signaled to indicate whether current mode is MPM or not. Then, if MPM flag is true, truncated unary code is used to signal the MPM index, otherwise, 6-bit fix length coding is used to signal the remaining modes.

Figure 7:
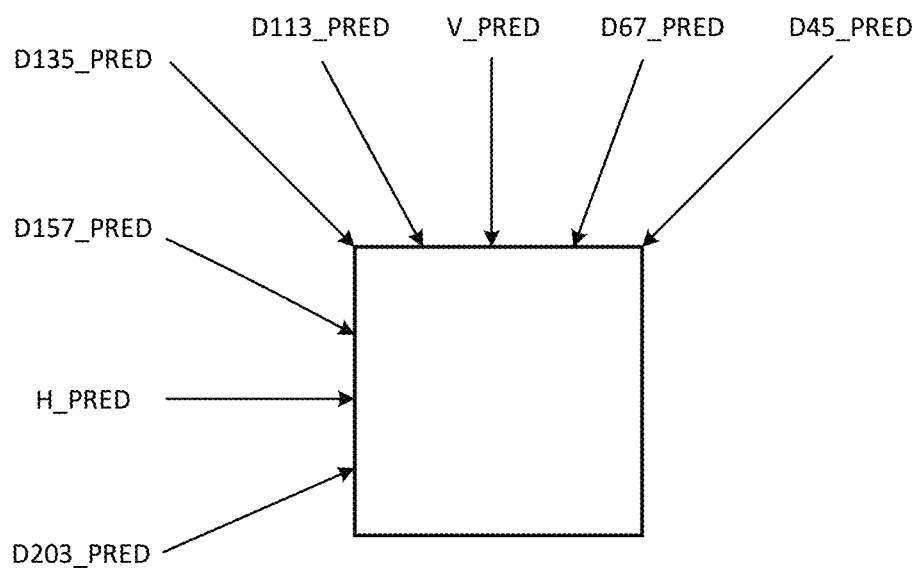
FIG. 7 illustrates 8 nominal angles of the intra prediction modes in the AV1 standard.

On the other hand, 56 angular intra prediction modes, 5 non-angular smooth intra prediction modes, one chroma only intra prediction mode, and some other intra prediction modes are defined by the AV1 standard. 8 directional (or angular) modes correspond to angles from 45 to 207 degrees. To exploit more varieties of spatial redundancy in directional textures, directional intra prediction modes are extended to an angle set with finer granularity. The angles of the 8 directional modes are slightly changed and made as nominal angles, and these 8 nominal angles are also called nominal intra angles and named as V_PRED, H_PRED, D45_PRED, D135_PRED, D113_PRED, D157_PRED, D203_PRED, and D67_PRED, corresponding to 90°, 180°, 45°, 135°, 113°, 157°, 203°, and 67°, as illustrated in FIG. 7. Each nominal angle is extended to 7 finer angles. So 56 directional angles (also known as intra angles or prediction angles) are defined in total. Each prediction angle is presented by a nominal intra angle plus an angle delta, which is −3~3 multiplies the step size of 3 degrees. To implement directional intra prediction modes via a generic way, all the 56 directional intra prediction modes are implemented with a unified directional predictor that projects each pixel to a reference sub-pixel location and interpolates the reference pixel by a 2-tap bilinear filter.

Figure 8:
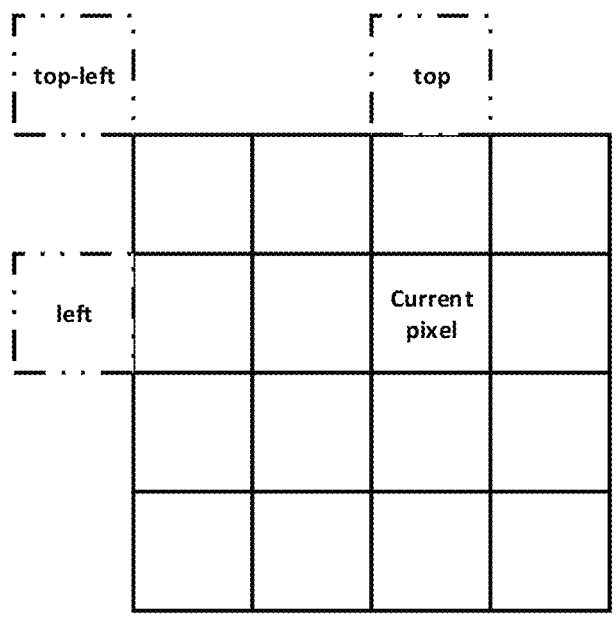
FIG. 8 illustrates top, left, and top-left positions for PAETH mode consistent with embodiments of the present disclosure.

The intra prediction modes also include 5 non-directional and/or smooth intra prediction modes, which are DC, PAETH, SMOOTH, SMOOTH_V, and SMOOTH_H. For DC prediction, the average of left and above neighboring samples is used as the predictor of the block to be predicted. For PAETH predictor, top, left and top-left reference samples are firstly fetched, and then the value which is closest to (top+left−top-left) is set as the predictor for the pixel to be predicted. FIG. 8 illustrates the positions of top, left, and top-left samples for one pixel in the current block. For SMOOTH, SMOOTH_V, and SMOOTH_H modes, they predict the block using quadratic interpolation in vertical or horizontal directions, or the average both directions.

Figure 9:
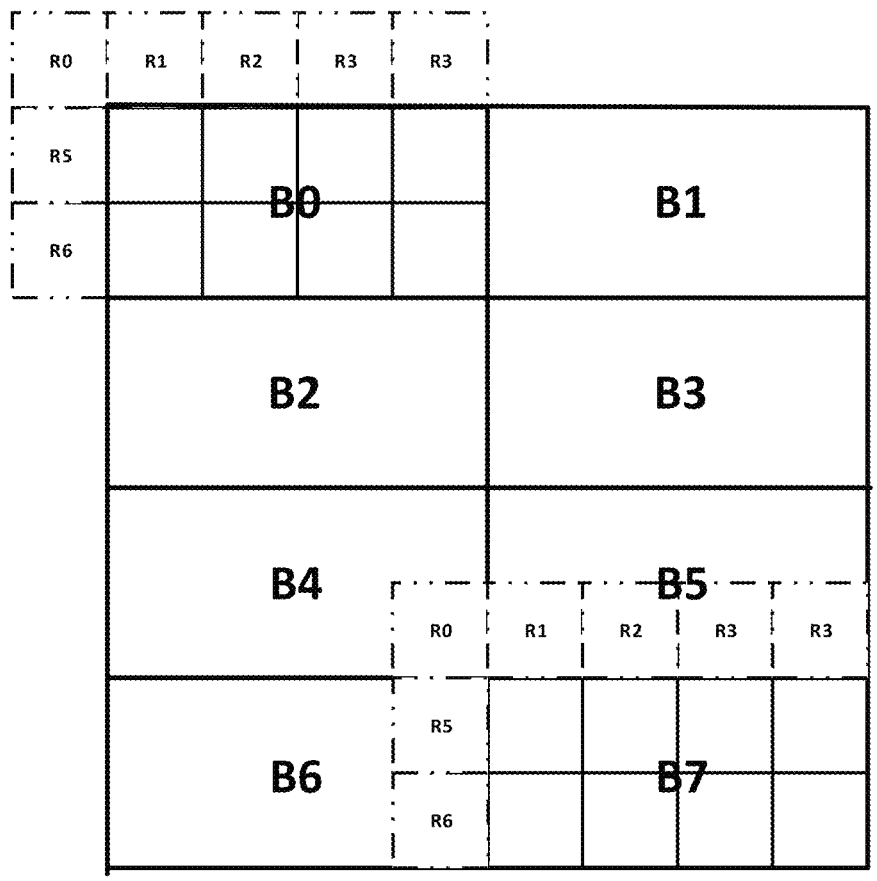
FIG. 9 illustrates examples of recursive intra filtering modes consistent with embodiments of the present disclosure.

To capture decaying spatial correlation with references on the edges, FILTER INTRA modes are designed for luma blocks. Five filter intra modes are defined. Each of the five filter intra modes is represented by a set of eight 7-tap filters reflecting correlation between pixels in a 4×2 patch and 7 adjacent neighbors. In other words, the weighting factors for 7-tap filter are position dependent. Take an 8×8 block for example, it is split into 8 4×2 patches, as shown in FIG. 9. These patches are indicated by B0, B1, B2, B3, B4, B5, B6, and B7 in FIG. 9. For each patch, 7 adjacent neighbors, indicated by R0~R7, are used to predict the pixels in the current patch. For the patch B0, all the adjacent neighbors are already reconstructed. But for other patches, not all the adjacent neighbors are reconstructed. The predicted values of the adjacent neighbors are used as references. For example, all the adjacent neighbors of the patch B7 are not reconstructed, so the prediction samples of the adjacent neighbors (i.e., B5 and B6) are used instead.

Chroma from Luma (CfL) is a chroma-only intra predictor that models chroma pixels as a linear function of coincident reconstructed luma pixels. The CfL prediction is expressed as follows:

$$CfL(\alpha) = \alpha \times L_{AC} + DC$$

where $L_{AC}$ denotes the AC contribution of the luma component, a denotes the parameter of the linear model, and DC denotes the DC contribution of the chroma component. Specifically, the reconstructed luma pixels are subsampled into the chroma resolution, and then the average value is subtracted to form the AC contribution. To approximate chroma AC component from the AC contribution, instead of requiring the decoder to calculate the scaling parameters, CfL determines the parameter a based on the original chroma pixels and signals them in the bitstream. This approach reduces decoder complexity and yields more precise predictions. As for the DC contribution of the chroma component, it is computed using intra DC mode, which is sufficient for most chroma content and has mature fast implementations.

Returning to FIG. 5, at S540, a residual symbol level is transformed and quantized. Large block-size transforms include up to 64×64 in size. High frequency transform coefficients are zeroed out for the transform blocks with size equal to 64, so that only the lower-frequency coefficients are retained. When transforming a large block in the transform skip mode, the entire block is used without zeroing out any values. Further, multiple transform selection (MTS) is supported for core transform. To control the MTS, separate enabling flags are used at a sequence parameter set (SPS) level for intra and inter prediction, respectively. When the MTS is enabled at the SPS level, a CU level flag is signaled to indicate whether the MTS is applied or not. Other transform features may be supported, such as low-frequency non-separable transform (LFNST) and sub-block transform (SBT).

Further, a maximum of 63 quantization parameters (QPs) is supported by the transforming and quantizing process. A flexible luma-to-chroma QP mapping is also supported by signaling the luma-to-chroma mapping relationship in the SPS. The CU-level QP adaption where delta QP values for luma and chroma components can be signaled separately may also be supported. Other quantization features, such as dependent quantization may also be supported.

As shown in FIG. 5, at S550, the transformed and quantized residual symbol level is entropy coded. The entropy coding algorithm may be Context-based Adaptive Binary Arithmetic Coding (CABAC). A CABAC coding engine may be used to encode syntax elements outputted by the transforming and quantizing process. The CABAC coding engine supports arithmetic coding algorithms such as Golomb-Rice coding algorithm. Separate residual coding structures may be supported for a transform block and a transform skip block. The transform coefficients of a coding block may be coded by using non-overlapped coefficient groups (CGs or sub-blocks) and each CG contains the transform coefficients of a coding block of a variable size. The size of the coefficient group is selected based on a transform block size only, which is independent of channel type. The size of the CGs may include 1×16, 2×8, 8×2, 2×4, 4×2, and 16×1. The CGs inside each coding block and the transform coefficients within each CG are coded according to pre-defined scanning orders.

As shown in FIG. 5, at S560, a bitstream is outputted. As a result of entropy coding, the bitstream is outputted. The bitstream may be transmitted and/or stored. A decoder may perform a video decoding method corresponding to the video encoding method consistent with the present disclosure to restore the original video.

To accommodate the intra mode coding for various video coding formats, two intra prediction mode sets, named as allowed intra prediction mode set (AIPM) and disallowed intra prediction mode (DIPM) set may be defined for each coding block. The AIPM set is defined as one mode set with modes that can be used for intra prediction of the current block, and the DIPM set is defined as one mode set with modes that cannot be signaled or used for intra prediction of the current block. Each intra prediction mode in the AIPM set and the DIPM set is identified by an index number. For each block, the intra prediction modes in these two mode sets are derived according to the intra prediction modes of neighboring blocks. The intra prediction modes of the neighboring blocks (i.e., neighboring modes) are included in the AIPM set but not included in the DIPM set. The number of modes included in the AIPM set and the number of modes included in the DIPM set are predefined and fixed for all blocks. When the size of the AIPM set is S and the number of derived intra prediction modes from neighboring modes are less than S, the default modes are used to fill the AIPM set.

The number of available intra prediction modes is 62, which includes 56 angular intra prediction modes, 5 smooth modes, and one chroma from luma (CfL) mode. For 56 angular intra prediction modes, 8 of them are named as nominal angles, and each of the nominal angle has 7 delta angles (including the nominal angle itself which has 0 delta angle), which are different from the angles defined by the VVC standard. In addition, the smooth intra prediction modes are defined differently by the AV1 standard and the VVC standard. Thus, the intra prediction modes included in the AIPM set may be determined to accommodate the video coding formats in both standards.

Accordingly, the present disclosure provides a video coding method. The method includes the intra mode coding that can be seamlessly applied to the video coding schemes based on both the VVC standard and the AV1 standard. The method may be used separately or combined in any order. In the present disclosure, if an intra coding mode is not a smooth mode, or is generating prediction samples according to a given prediction direction, the intra coding mode is called angular mode. Further, the embodiments of the encoders and decoders consistent with the present disclosure may be implemented by processing circuitry (e.g., one or more processors or one or more integrated circuits), which executes program instructions stored in a non-transitory computer-readable storage medium.

Figure 10:
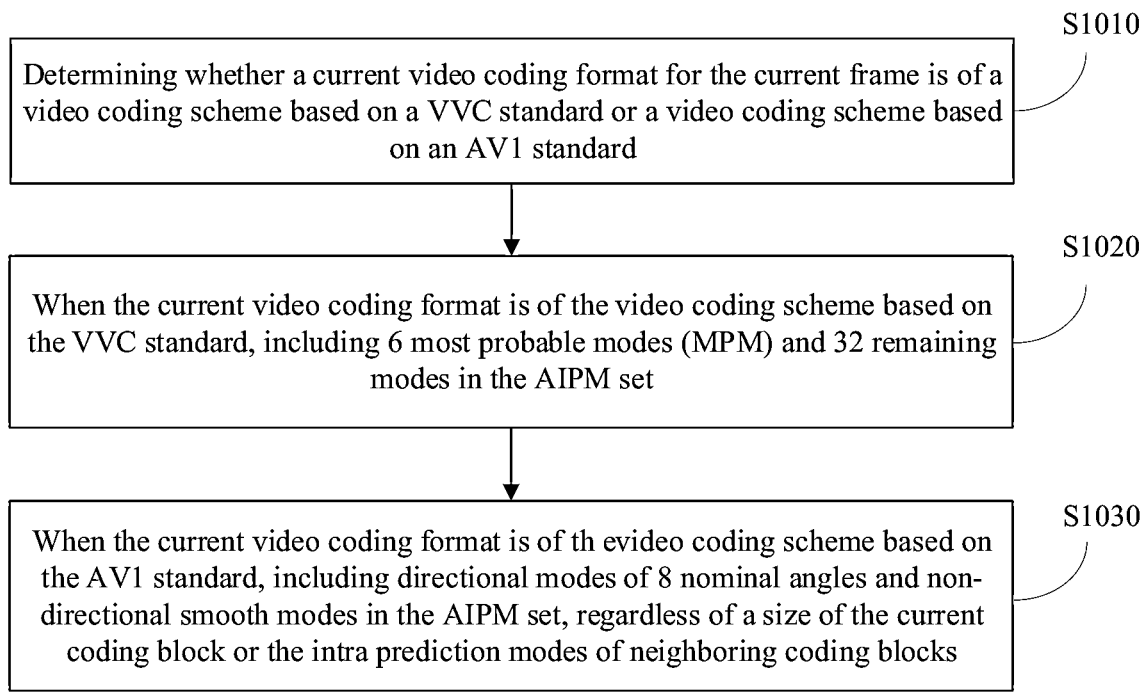
FIG. 10 illustrates a flowchart of determining the intra prediction modes included in the allowed intra prediction mode (AIPM) set consistent with embodiments of the present disclosure.

To make the intra mode coding applicable for video coding formats of the video coding schemes based on both the VVC standard and the AV1 standard, the video coding method provides a process for determining the intra prediction modes included in the allowed intra prediction mode (AIPM) set. FIG. 10 illustrates a flowchart of determining the intra prediction modes included in the allowed intra prediction mode (AIPM) set consistent with embodiments of the present disclosure. As shown in FIG. 10, at S1010, the current video coding format is determined. The current video coding format may be one of the video coding formats of the video coding schemes based on the VVC standard, the AV1 standard, and revisions thereof.

Figure 11:
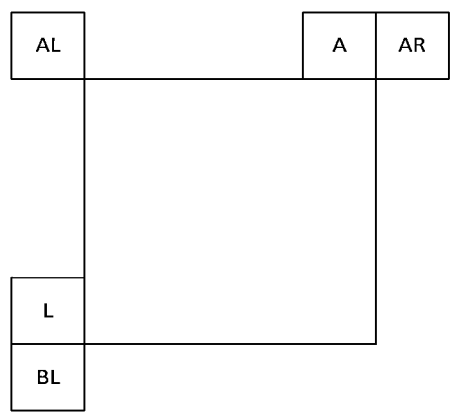
FIG. 11 illustrates positions of five neighboring coding blocks in the process of deriving the 6 MPMs consistent with embodiments of the present disclosure.

When the current video coding format is of the video coding scheme based on the VVC standard, the AIPM set for the video coding scheme based on the VVC standard includes 6 MPMs and 32 remaining modes for each coding block. The 6 MPMs are derived from five neighboring blocks as shown in FIG. 11. 32 remaining modes are derived by adding offset values to the angular neighboring modes in the MPM list. Offset values are selected from offsetList1={1, 2, 3, 4, 6, 8}. For each offset value, each angular neighboring mode is added to that offset as a remaining mode if not already included. After the derivation process is completed, a default mode list is used in case the remaining mode list is not full. The default mode list includes {0, 1, 2, 50, 18, 34, 66, 10, 26, 42, 58, 6, 14, 22, 30, 38, 46, 54, 62, 4, 8, 12, 16, 20, 24, 28, 32, 36, 40, 44, 48, 52, 56, 60, 64, 17, 19, 49, 51}. If the neighboring CU is outside of current CTU-row, those neighboring modes are skipped for MPM derivation process. To code an intra prediction mode, an MPM flag is signaled. If the MPM flag indicates the current mode is an MPM, a truncated unary codeword with bypass coding is used to signal the MPM index. Otherwise, a 5-bit fixed length codeword with bypass coding is used to signal the mode index of the remaining modes. 0.49% coding gain and 16% BD-rate improvement are achieved with almost no encoding time increase in VTM AI and RA configurations. Thus, by reducing the number of the intra prediction modes included in the AIPM set for the video coding scheme based on the VVC standard, the coding efficiency and the compression performance are improved.

Simulations are performed on Linux cluster using VTM configuration with AI and RA configurations to obtain the coding performance data shown in Table 1. The common test conditions are described in the JVET common test conditions and software reference configurations (JVET-K1010), which is incorporated herein by reference.

TABLE 1

| | Coding performance | | | | | | | | | |
|---|---|---|---|---|---|---|---|---|---|---|
| | All Intra Main10 | | | | | Random Access Main10 | | | | |
| | Y | U | V | EncT | DecT | Y | U | V | EncT | DecT |
| Class A1 | −0.41% | −0.27% | −0.29% | 99% | 95% | −0.15% | 0.01% | 0.00% | 95% | 97% |
| Class A2 | −0.42% | −0.36% | −0.39% | 99% | 97% | −0.14% | 0.10% | 0.02% | 95% | 97% |
| Class B | −0.47% | −0.34% | −0.39% | 96% | 94% | −0.17% | −0.04% | 0.03% | 95% | 95% |
| Class C | −0.57% | −0.51% | −0.31% | 98% | 99% | −0.18% | 0.07% | −0.10% | 95% | 92% |
| Class E | −0.56% | −0.38% | −0.42% | 98% | 95% | | | | | |
| Overall | −0.49% | −0.38% | −0.36% | 98% | 96% | −0.16% | 0.03% | −0.01% | 95% | 95% |
| Class D | −0.41% | −0.10% | −0.32% | 97% | 91% | −0.10% | −0.25% | 0.22% | 96% | 94% |
| Class F | −0.76% | −0.72% | −0.75% | 100% | 100% | −0.49% | −0.55% | −0.45% | 96% | 95% |

When the current video coding format is of the video coding scheme based on the AV1 standard, the AIPM set for the video coding scheme based on the AV1 standard includes angular intra prediction modes of eight nominal angles regardless of the size of the current block or the intra prediction modes of neighboring blocks, where the eight nominal angles are 45°, 67°, 90°, 113°, 135°, 157°, 180°, and 203°. The AIPM set for the AV1 video coding format further includes certain non-directional and/or smooth intra prediction modes regardless of the intra prediction modes of the neighboring blocks. The available non-directional and/or smooth intra prediction modes include DC, PAETH, SMOOTH, SMOOTH_V, and SMOOTH_H modes. For DC mode, the average of left and above neighboring samples is used as the predictor of the block to be predicted. For PAETH mode, top, left and top-left reference samples are firstly fetched, and then the value which is closest to (top+left−top-left) is set as the predictor for the pixel to be predicted. FIG. 8 illustrates the positions of top, left, and top-left samples for one pixel in the current block. For SMOOTH, SMOOTH_V, and SMOOTH_H modes, they predict the block using quadratic interpolation in vertical or horizontal directions, or the average both directions.

SMOOTH mode is placed at the first position of the AIPM set. DC mode is placed at the second position of the AIPM set. Only one of SMOOTH_H and SMOOTH_V modes is placed in the AIPM set when the current block is non-square block. When the current block is a vertical block (block height is greater than width), SMOOTH_V mode is placed in the AIPM set and when the current block is a horizontal block (block width is greater than block height), SMOOTH_H mode is placed in the AIPM set. Alternatively, when the current block is a vertical block, SMOOTH_H mode is placed in the AIPM set and when the current block is a horizontal block, SMOOTH_V mode is placed in the AIPM set.

The intra prediction modes included in the AIPM set may be split into 2 or 3 levels. For each level, the number of the modes is equal to power of 2, such as $2^L$, where L is a positive integer greater than 1. For example, the number of the modes in the AIPM set is S, the modes include 3 levels, and S is equal to $2^L+2^M+2^N$, where the modes with an index number smaller than $2^L$ in the AIPM set are called first level modes, and the modes with an index number equal to or larger than $2^L$ but smaller than $2^L+2^M$ are called second level modes, and so on.

At least one angular mode with non-zero angle delta is included at the first level of the AIPM set when at least one of the intra prediction modes of neighboring blocks is an angular mode. All the modes of the nominal angles are included at the first level of the AIPM set and all the non-directional and/or smooth modes are also included at the first level of the AIPM set. Additional angular modes with non-zero angle delta may be included in the second level and the third level of the AIPM set.

When the modes in the AIPM set include two levels, a flag is signaled to indicate whether the current mode belongs to the first level or the second level, and multi-symbol entropy coding (or other suitable entropy coding methods) is used to signal the index of the current mode in the first level or the second level. When the mode in the AIPM set include three levels, a first flag is signaled to indicate whether the current mode belongs to the first level or not. If the current mode does not belong to the first level, then a second flag is signaled to indicate whether the current mode belongs to the second level or the third level of the AIPM set. Further, an index number is signaled to indicate the current intra prediction mode in the indicated level by the aforementioned flags.

To reduce the complexity of reconstructing the AIPM set, at most P neighboring angular modes are used to derive the modes in the AIPM set, where P is a positive integer, such as 1 or 2 or 3. The number of angular modes in the neighboring blocks is used as a context indicator when signaling the intra prediction modes via a context coded arithmetic encoder.

When the number of neighboring angular modes is equal to 0, the first context is used. Otherwise, when the number of neighboring angular modes is equal to 1, the second context is used. Otherwise, when the number of neighboring angular modes is equal to 2, the third context is used.

Alternatively, when the number of neighboring angular modes is equal to 0, the first context is used. Otherwise, when the number of neighboring angular modes is equal to 1, the second context is used. Otherwise, when the number of neighboring angular modes is equal to 2 and two angular modes are equal, the third context is used. Otherwise, the fourth context is used.

For chroma block, both the number of angular modes in the neighboring blocks and the number of angular modes in the co-located luma block are combined to form the context indicator.

Further, the AIPM set for the luma component is named as AIPM_Luma set and the AIPM set for the chroma component is named as AIPM_Chroma set. The AIPM_Luma set is constructed by using the luma modes of the neighboring blocks, and the AIPM_Chroma set is constructed by using the chroma modes of the neighboring blocks and/or the luma modes of the co-located luma block.

When the luma component and the chroma component share the same AIPM set, the AIPM set is constructed by using the luma modes of the neighboring blocks. The chroma component includes additional cross component linear model modes, such as chroma from luma (CfL) mode. For example, when the number of the allowed modes for the luma component is S, the number of the allowed modes for chroma component is S+1. For the chroma component, a flag is signaled to indicate whether the current mode is the CfL mode or not. When the current mode is not the CfL mode, additional flags are signaled to indicate the index number of the current mode in the AIPM set.

Alternatively or additionally, the number of the allowed modes for the chroma component is kept the same as the number of the allowed modes for the luma component. However, one of the allowed modes in the AIPM set is replaced by the CfL mode.

Alternatively or additionally, the AIPM_Luma set is constructed by using the luma modes of the neighboring blocks, and the AIPM_Chroma set is a subset of the AIPM_Luma set plus the cross component linear model modes, such as the Chroma from Luma (CfL) mode.

Alternatively or additionally, only the modes at the first level of the AIPM_Luma set is included in the AIPM_Chroma set, and the remaining modes of the AIPM_Luma set is not included in the AIPM_Chroma set.

Alternatively or additionally, the AIPM_Luma set is constructed by using the luma modes of the neighboring blocks, and the AIPM_Chroma set is constructed by using the chroma modes of the neighboring blocks.

In the embodiments of the present disclosure, the video coding method supports the intra prediction modes in the video coding schemes based on both the VVC standard and the AV1 standard to improve the coding efficiency and the compression performance.

Although the principles and implementations of the present disclosure are described by using specific embodiments in the specification, the foregoing descriptions of the embodiments are only intended to help understand the method and core idea of the method of the present disclosure. Meanwhile, a person of ordinary skill in the art may make modifications to the specific implementations and application range according to the idea of the present disclosure. In conclusion, the content of the specification should not be construed as a limitation to the present disclosure.

What is claimed is:

1. A video decoding method, comprising:
   obtaining a current frame of a video input;
   partitioning the current video frame into a plurality of coding blocks;
   predicting a symbol level for each coding block in intra prediction modes included in an allowed intra prediction mode (AIPM) set, wherein the AIPM set for luma components in each coding block is called AIPM_Luma, and the AIPM set for chroma components in each coding block is called AIPM_Chroma;
   transforming and quantizing a residual symbol level;
   entropy coding the transformed and quantized residual symbol level; and
   outputting a bitstream,
   wherein the intra prediction modes included in the AIPM set are determined by:
      determining whether a current video coding format for the current frame is of a video coding scheme based on a Versatile Video Coding (VVC) standard or a video coding scheme based on an AOMedia Video 1 (AV1) standard;
      when the current video coding format is of the video coding scheme based on the VVC standard, including 6 most probable modes (MPM) and 32 remaining modes in the AIPM set; and
      when the current video coding format is of the video coding scheme based on the AV1 standard, including directional modes of 8 nominal angles and non-directional or smooth modes in the AIPM set, regardless of a size of the current coding block or the intra prediction modes of neighboring coding blocks.

2. The method according to claim 1, wherein when the current video coding format is of the video coding scheme based on the VVC standard:
   the 6 MPMs are derived from 5 neighboring coding blocks;
   the 32 remaining modes are derived by adding offset values to the angular neighboring modes in the 6 MPMs; and
   when the derivation process produces less than 32 remaining modes, additional modes are selected from a default mode list until 32 remaining modes are reached.

3. The method according to claim 2, wherein:
   the offset values are selected from {1, 2, 3, 4, 6, 8};
   for each offset value, each angular neighboring mode is added to that offset value to produce a remaining mode unless it is already produced; and
   the default mode list includes {0, 1, 2, 50, 18, 34, 66, 10, 26, 42, 58, 6, 14, 22, 30, 38, 46, 54, 62, 4, 8, 12, 20, 24, 28, 32, 36, 40, 44, 48, 52, 56, 60, 64, 17, 19, 49, 51}.

4. The method according to claim 1, wherein when the current video coding format is of the video coding scheme based on the AV1 standard:
   the angular intra prediction modes in the AIPM set are derived from no more than M number of neighboring coding blocks, wherein M is a positive integer;
   the 8 nominal angles are 45°, 67°, 90°, 113°, 135°, 157°, 180°, and 203°; and
   the non-directional or smooth intra prediction modes include a DC mode, a PAETH mode, a SMOOTH mode, a SMOOTH_V mode, and a SMOOTH_H mode.

5. The method according to claim 4, wherein:
   the SMOOTH mode is placed in the first position of the AIPM set; and
   the DC mode is placed in the second position of the AIPM set.

6. The method according to claim 5, wherein:
   when the height of the current coding block is greater than or equal to the width of the current coding block, the SMOOTH_V mode is included in the AIPM set; and
   when the width of the current coding block is greater than the height of the current coding block, the SMOOTH_H mode is included in the AIPM set.

7. The method according to claim 5, wherein:
   when the width of the current coding block is greater than or equal to the height of the current coding block, the SMOOTH_V mode is included in the AIPM set; and
   when the height of the current coding block is greater than the width of the current coding block, the SMOOTH_H mode is included in the AIPM set.

8. The method according to claim 4, further including:
   splitting the AIPM set into K levels, wherein K is an integer greater than 1 and each of the K levels includes $2^L$ number of intra prediction modes, wherein L is an integer greater than 1.

9. The method according to claim 8, wherein:
   the first level of the K levels of the AIPM set includes at least one angular intra prediction mode of non-nominal angles when one of the intra prediction modes of the neighboring coding blocks is an angular intra prediction mode; or the first level of the K levels of the AIPM set includes the angular intra prediction modes of all the nominal angles; or the first level of the K levels of the AIPM set includes the non-directional or smooth intra prediction modes.

10. The method according to claim 8, wherein:

when K is equal to 2, the entropy coding signals a first flag to indicate whether the current intra prediction mode is at the first level or the second level, and the index number of the current intra prediction mode in the indicated level; and when K is equal to 3, the entropy coding signals a first flag to indicate whether the current intra prediction mode is at the first level or not, a second flag to indicate whether the current intra prediction mode is at the second level or the third level, and the index number of the current intra prediction mode in the indicated level.

11. The method according to claim 4, wherein:

the number of the angular intra prediction modes of the neighboring coding blocks is used as a context indicator to signal the intra prediction modes in context modeling of entropy coding.

12. The method according to claim 11, wherein:

when the number of the angular intra prediction modes of the neighboring blocks is equal to 0, a first context is used;

when the number of the angular intra prediction modes of the neighboring blocks is equal to 1, a second context is used; and when the number of the angular intra prediction modes of the neighboring blocks is equal to 2, a third context is used.

13. The method according to claim 11, wherein:

when the number of the angular intra prediction modes of the neighboring blocks is equal to 0, the first context is used;

when the number of the angular intra prediction modes of the neighboring blocks is equal to 1, the second context is used;

when the number of the angular intra prediction modes of the neighboring blocks is equal to 2 and the two angular intra prediction modes are equal, the third context is used; and when the number of the angular intra prediction modes of the neighboring blocks is equal to 2 and the two angular intra prediction modes are not equal, a fourth third context is used.

14. The method according to claim 11, wherein:

when the current block is a chroma block, the context indicator is derived from the number of the angular intra prediction modes of the neighboring chroma blocks and the number of the angular intra prediction modes of co-located luma block.

15. The method according to claim 1, wherein:

AIPM_Luma is constructed by using luma modes of neighboring blocks; and

AIPM_Chroma is constructed by using chroma modes of the neighboring blocks.

16. The method according to claim 15, wherein:

AIPM_Chroma further includes a chroma from luma (CfL) mode or replaces one of the chroma modes by the CfL mode, wherein each mode in AIPM_Chroma includes a CfL flag to indicate whether the corresponding mode is the CfL mode.

17. The method according to claim 1, wherein:

AIPM_Luma is constructed by using luma modes of neighboring blocks; and

AIPM_Chroma is constructed by using chroma modes of the neighboring blocks and the luma modes of the neighboring blocks.

18. The method according to claim 1, wherein:

AIPM_Luma is split into multiple levels; and

AIPM_Chroma includes a first level of AIPM_Luma plus the CfL mode, wherein each mode in AIPM_Chroma includes a CfL flag to indicate whether the corresponding mode is the CfL mode.

19. A video decoding system, comprising:

a memory storing computer program instructions; and a processor coupled to the memory and, when executing the computer program instructions, configured to perform:

obtaining a current frame of a video input;

partitioning the current video frame into a plurality of coding blocks;

predicting a symbol level for each coding block in intra prediction modes included in an allowed intra prediction mode (AIPM) set, wherein the AIPM set for luma components in each coding block is called AIPM_Luma, and the AIPM set for chroma components in each coding block is called AIPM_Chroma;

transforming and quantizing a residual symbol level;

entropy coding the transformed and quantized residual symbol level; and outputting a bitstream, wherein the intra prediction modes included in the AIPM set are determined by:

determining whether a current video coding format for the current frame is of a video coding scheme based on a Versatile Video Coding (VVC) standard or a video coding scheme based on an AOMedia Video 1 (AV1) standard;

when the current video coding format is of the video coding scheme based on the VVC standard, including 6 most probable modes (MPM) and 32 remaining modes in the AIPM set; and when the current video coding format is of the video coding scheme based on the AV1 standard, including directional modes of 8 nominal angles and non-directional or smooth modes in the AIPM set, regardless of a size of the current coding block or the intra prediction modes of neighboring coding blocks.

20. The video decoding system according to claim 19, wherein when the current video coding format is of the video coding scheme based on the VVC standard:

the 6 MPMs are derived from 5 neighboring coding blocks;

the 32 remaining modes are derived by adding offset values to the angular neighboring modes in the 6 MPMs; and when the derivation process produces less than 32 remaining modes, additional modes are selected from a default mode list until 32 remaining modes are reached.

* * * * *